United States Patent
Maruo et al.

(10) Patent No.: US 8,380,396 B2
(45) Date of Patent: Feb. 19, 2013

(54) TRAVEL CONTROL METHOD FOR SELF-PROPELLED CARRIAGE

(75) Inventors: Masaru Maruo, Tochigi (JP); Hideshi Takekuma, Tochigi (JP)

(73) Assignee: Honda Motor Co., Ltd., Tokyo (JP)

( * ) Notice: Subject to any disclaimer, the term of this patent is extended or adjusted under 35 U.S.C. 154(b) by 615 days.

(21) Appl. No.: 11/577,788

(22) PCT Filed: Nov. 9, 2005

(86) PCT No.: PCT/JP2005/020987
§ 371 (c)(1),
(2), (4) Date: Apr. 23, 2007

(87) PCT Pub. No.: WO2006/051999
PCT Pub. Date: May 18, 2006

(65) Prior Publication Data
US 2008/0110682 A1    May 15, 2008

(30) Foreign Application Priority Data
Nov. 9, 2004    (JP) .................................. 2004-325387

(51) Int. Cl.
*B62D 6/00* (2006.01)
(52) U.S. Cl. .................. 701/41; 701/2; 701/22; 701/36; 701/116; 700/245; 700/253; 180/204; 180/6.28; 180/271
(58) Field of Classification Search .................. 701/1, 2, 701/19, 21–28, 36, 41–44, 50–54, 65, 70–91, 701/117, 124, 200–202, 205, 207, 223, 226, 701/300–302; 382/100, 153; 700/245, 250–255, 700/258–261; 342/71
See application file for complete search history.

(56) References Cited

U.S. PATENT DOCUMENTS

| | | | | |
|---|---|---|---|---|
| 4,130,210 A | * | 12/1978 | Purviance | 414/428 |
| 4,249,159 A | * | 2/1981 | Stasko | 340/958 |
| 4,862,047 A | * | 8/1989 | Suzuki et al. | 318/587 |
| 4,866,617 A | * | 9/1989 | Matsuda et al. | 701/25 |
| 5,002,145 A | * | 3/1991 | Wakaumi et al. | 180/168 |
| 5,111,401 A | * | 5/1992 | Everett et al. | 701/24 |
| 5,227,973 A | * | 7/1993 | Marcantonio | 701/23 |
| 5,535,843 A | * | 7/1996 | Takeda et al. | 180/200 |
| 5,545,960 A | * | 8/1996 | Ishikawa | 318/587 |
| 5,549,175 A | * | 8/1996 | Torii et al. | 180/209 |
| 5,870,303 A | * | 2/1999 | Trovato et al. | 700/61 |

(Continued)

FOREIGN PATENT DOCUMENTS

| | | |
|---|---|---|
| DE | 19510992 | 9/1995 |
| JP | 07081301 | 3/1995 |

(Continued)

*Primary Examiner* — Jonathan M Dager
(74) *Attorney, Agent, or Firm* — Rankin, Hill & Clark LLP

(57) ABSTRACT

A travel control method for a self-propelled carriage having a travel control section for controlling steering-driving wheels. In the method, the steering-driving wheels are steered by a predetermined angle based on a direction change command, and in this state, the carriage is moved forward and backward for a predetermined distance to make the carriage depart from a base line. Then, the carriage is steered toward the base line to return to the base line. After that, the carriage is made to be able to travel along the base line.

1 Claim, 6 Drawing Sheets

U.S. PATENT DOCUMENTS

| | | | |
|---|---|---|---|
| 5,913,919 A * | 6/1999 | Bauer et al. | 701/301 |
| 5,920,172 A * | 7/1999 | Bauer | 318/587 |
| 5,995,884 A * | 11/1999 | Allen et al. | 701/24 |
| 6,142,252 A * | 11/2000 | Kinto et al. | 180/204 |
| 6,305,484 B1 * | 10/2001 | Leblanc | 180/167 |
| 6,442,456 B2 * | 8/2002 | Burns et al. | 701/23 |
| 6,928,363 B2 * | 8/2005 | Sankrithi | 701/120 |
| 7,155,308 B2 * | 12/2006 | Jones | 700/245 |
| 2002/0145079 A1 * | 10/2002 | Burley | 244/114 R |
| 2003/0010545 A1 * | 1/2003 | Takeuchi | 180/6.28 |
| 2005/0065662 A1 * | 3/2005 | Reindle et al. | 701/1 |

FOREIGN PATENT DOCUMENTS

| | | |
|---|---|---|
| JP | 07114414 | 5/1995 |
| JP | 09-034548 | 2/1997 |
| JP | 09034548 | 2/1997 |
| JP | 09-081240 | 3/1997 |
| JP | 11095841 | 4/1999 |

\* cited by examiner

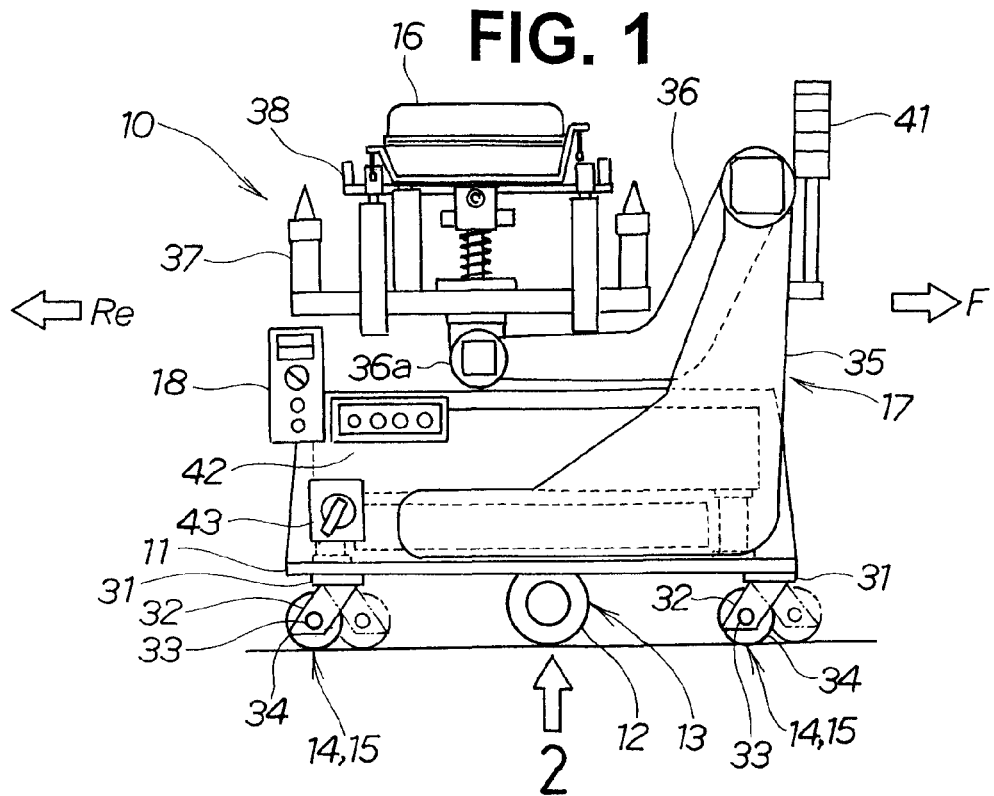
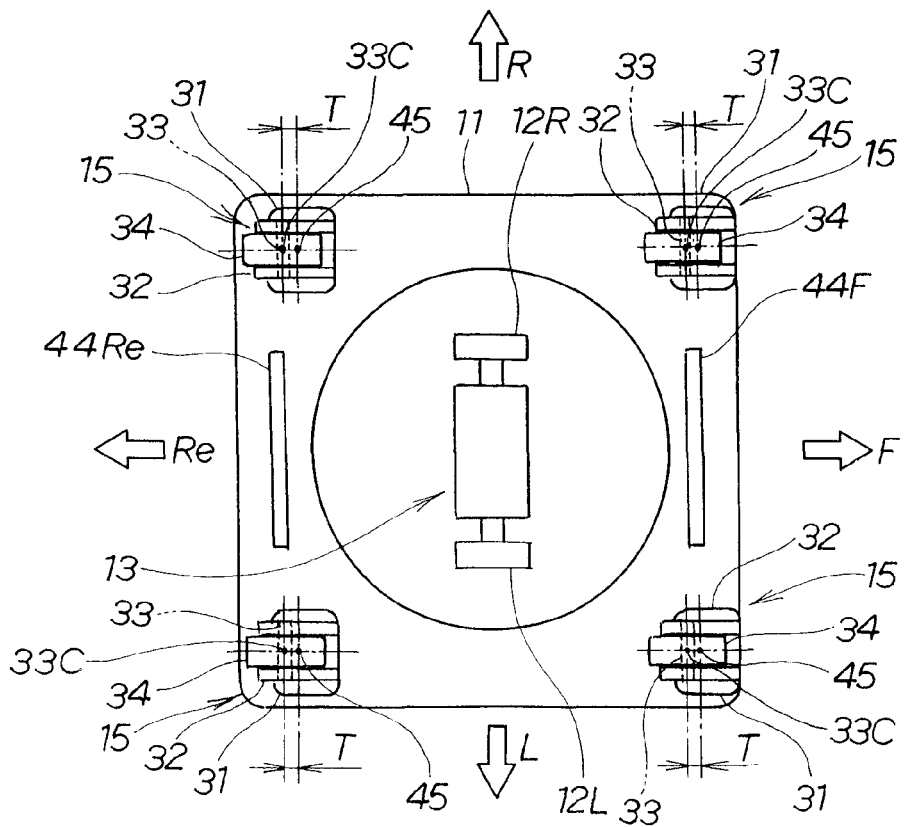

TRAVEL CONTROL METHOD FOR SELF-PROPELLED CARRIAGE

TECHNICAL FIELD

The present invention relates to a self-propelled carriage having caster wheels, and to a travel control method for a self-propelled carriage for minimizing lateral wobbling that occurs when a travel direction changes from forward to backward or from backward to forward.

BACKGROUND ART

Prior art self-propelled carriages having caster wheels provided to the periphery of steering/driving wheels and configured so that the direction of the self-propelled carriage changes in accordance with changes in a steering direction of the steering/driving wheels have been disclosed in, e.g., Japanese Patent Laid-Open Publication No. 7-257387. A self-propelled carriage shall be described with reference to FIGS. 6, 7A, and 7B hereof.

FIG. 6 is a diagram used to describe a basic configuration of the prior art technology. In a self-propelled carriage 100 (also referred to below simply as a "carriage"), shafts 102, 102 are mounted on a carriage frame 101 in a longitudinal direction; sliding guides 103, 103 and an intermediate plate 104 are mounted on the shafts 102, 102 while allowed to be raised and lowered; the intermediate plate 104 is pressed down by springs 105, 105; a raising and lowering servo motor 106 is provided to a center of the intermediate plate 104; a ball screw 107 is raised and lowered by the servo motor 106; a driving section 112 is connected to a lower end of the ball screw 107; a driving wheel 111 is provided to the driving section 112; sliding guides 113 are mounted on four corners of the carriage frame 101; and caster wheels 120 are mounted on the sliding guides 113 via shafts 114 and springs 115 while allowed to be raised and lowered.

FIGS. 7A and 7B are a plan view and an operational diagram of the caster wheels shown in FIG. 6.

In FIG. 7A, the caster wheels 120 are composed of a stand 121, a holder 122 turnably mounted on the stand 121, and a wheel 123 rotatably mounted on the holder 122. Point A indicates a turning center of the holder 122, and point Y indicates a point of contact between the wheel 123 and a path surface.

A description shall be provided of a change when the carriage traveling toward F stops and starts to travel toward Re.

A force in a leftward direction as viewed in the drawing (toward Re) acts upon the stand 121. The wheels 123 start to rotate, but are casters and therefore tend to turn about the point A. However, a force of friction with the path surface is created at point Y, and the wheels 123 do not move upward or downward as viewed in the drawing. Instead, the stand 121 starts to turn as indicated by a trajectory M.

In principle, the turning does not occur when the point A and point Y are on a traveling line. This is because the wheels 123 may rotate while being pushed, but start to turn when the point A departs even slightly from the traveling line. The load-carrying platform abruptly starts to move toward a direction perpendicular to the traveling line at an early stage of turning so as to noticeably depart from the trajectory M. This causes the load-carrying platform to vibrate and undergo lateral wobbling.

In FIG. 7B, the semicircular trajectory M extends in front of the wheels 123 while being formed so that the stand 121 moves from point A to point B and then to point C. If the stand 121 is disposed to the front and the wheels 123 are disposed to the rear, the caster wheels 120 will then shake in a vertical direction as viewed in the drawing.

However, in an automated line, lateral wobbling and vibration in the load-carrying platform cannot be alleviated in order to forcibly perform a switchback operation on the traveling line. Large-scale lateral wobbling causes damage to components, e.g., when a precision part has been mounted on the load-carrying platform, and is therefore undesirable.

In other words, in the self-propelled carriage, it is desirable to reduce shaking or vibration in a width direction that occurs in the carriage in conjunction with the switchback operation.

DISCLOSURE OF THE INVENTION

It is an object of the present invention to provide a technique for reducing lateral wobbling caused by the operation of caster wheels in a carriage when a self-propelled carriage comprising the caster wheels is switched back.

The present inventors focused attention on instances where an operator increases or reduces pressure when using a manual carriage; i.e., presses diagonally forward (usually subconsciously) to turn the caster wheels and prompt smooth turning to result in minimized occurrences of lateral wobbling and vibration. When a control element is added for causing the automatically controlled load-carrying platform to travel slightly diagonally, the caster wheels are able to be turned, and the detrimental lateral wobbling and vibration are able to be minimized.

In view of the above findings, the present invention provides a travel control method for a self-propelled carriage, which has a base, steering/driving wheels steerably provided to the base, caster wheels provided to the base in order to stabilize the carriage, and a travel control section for controlling the steering/driving wheels, and which is principally made to shuttle back and forth along a base line. the travel control method comprising the steps of: steering the steering/driving wheels at a predetermined angle during a stop or thereafter upon receiving a direction change command such as advance/stop/reverse or reverse/stop/advance, causing the carriage to move forward or backward a predetermined distance while in the aforedescribed state, thereby causing the self-propelled carriage to depart from the baseline, returning the steering to a previous state and then steering the carriage toward the base line, causing the carriage to move forward or backward a predetermined distance while in the aforedescribed state, thereby causing the self-propelled carriage to depart from the baseline, and returning the steering to a previous state and allowing the self-propelled carriage to travel along the base line when the self-propelled carriage reaches the base line.

According to the thus-arranged control method, the large-scale lateral wobbling and vibration that has conventionally occurred in a self-propelled carriage can be dramatically reduced. Therefore, precision parts and other parts adversely affected by vibration can be transported.

BRIEF DESCRIPTION OF THE DRAWINGS

FIG. 1 is a side elevational view of a self-propelled carriage having caster wheels, according to the present invention;

FIG. 2 is a view of the self-propelled carriage as seen from arrow 2 of FIG. 1;

BEST MODE FOR CARRYING OUT THE INVENTION

Figure 3:
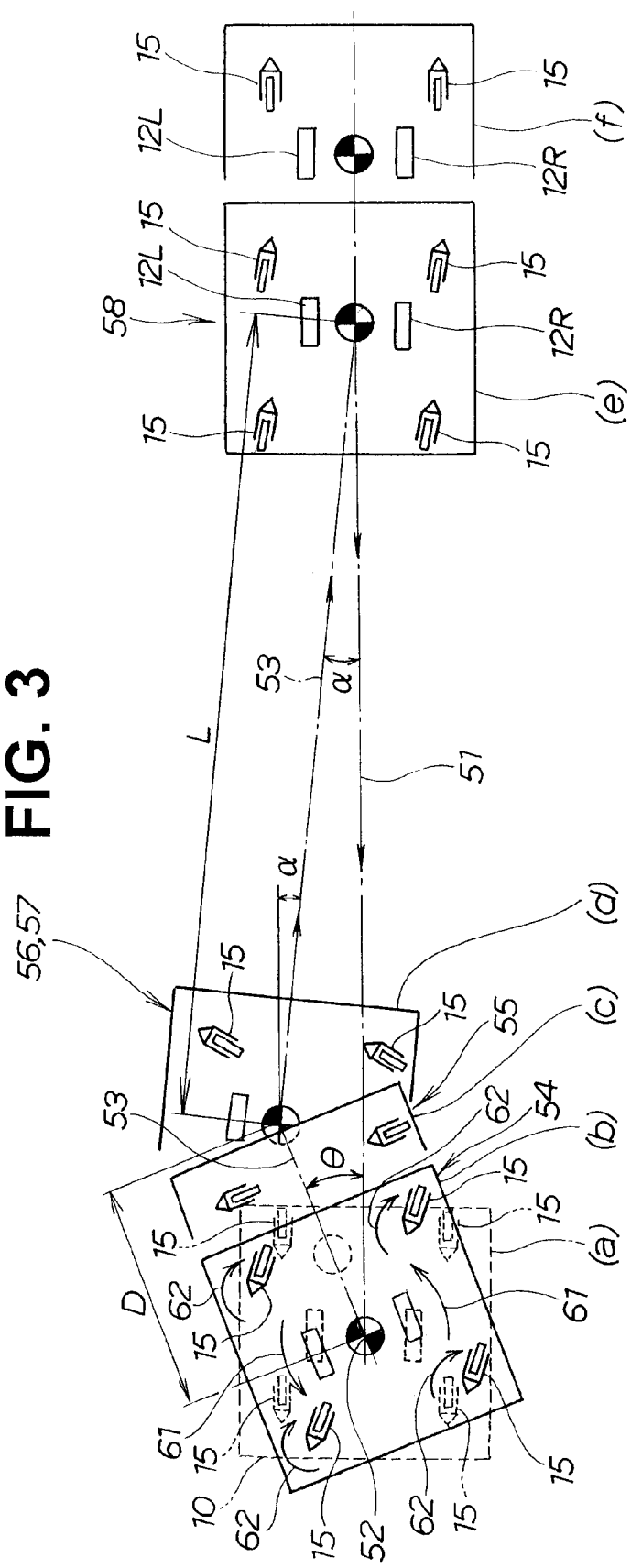
FIG. 3 is a diagram showing a method for controlling the self-propelled carriage during switchback.

The embodiments of the present invention are now described below with reference to the accompanying drawings.

In FIGS. 1 and 2, a carriage is oriented so that F is a forward direction, Re is a backward direction, R is a rightward direction, and L is a leftward direction; and a carriage 10 is assumed to be in forward movement when working in the forward direction, and in backward movement when working in the backward direction.

FIG. 1 is a side view of a self-propelled carriage according to the present invention, comprising a caster wheel. The main elements constituting the self-propelled carriage 10 are a platform 11 that doubles as a frame for the carriage; a drive section 13 for driving the carriage 10, with the drive section 13 provided with a drive wheel 12, and mounted to a lower surface of the platform 11; and a caster wheel 15 for supporting the carriage 10, with the caster wheel 15 mounted as a reinforcing wheel 14 to a front and rear of the drive section 13.

Reference symbol 17 indicates a loader section mounted on an upper surface of the platform 11 and used for loading or unloading a workpiece 16 or the like; and reference symbol 18 indicates a travel-control section for controlling the loader section 17 and drive section 13.

The caster wheels 15 are composed of a base 31, which is a member mounted on the platform 11; a holder member 32 that is rotatably mounted via the base 31; and a wheel 34 rotatably mounted to a lower part of the holder member 32 via a rotation shaft 33. An orientation of the holder member 32 changes in accordance with the traveling direction of the carriage 10, and the caster wheel 34 rotates, thereby functioning to support the carriage 10 while changing the orientation of the carriage 10 in the movement direction.

The loader section 17 is composed of a body section 35, a loader arm 36 that extends from the body section 35 in a transverse direction and is mounted while allowed to be raised and lowered, a loader frame 37 mounted to a distal end 36a of the loader arm 36 for supporting the workpiece 16, and an attachment 38 exchangeably mounted above the loader frame 37 for receiving the workpiece 16.

Reference symbols 41, 42, and 43 respectively indicate an operation state display device, a manual operation board, and a power supply switch.

In other words, the self-propelled carriage 10 comprises the platform 11, the steering/driving wheel 12 provided to the platform 11, the caster wheel 15 provided to the platform 11 in order to stabilize the carriage 10, and the travel-control section 18 for controlling the steering/driving wheel 12.<BR>

FIG. 2 is a view from the perspective of an arrow 2 of FIG. 1. In the carriage 10, the drive section 13 laterally comprising the drive-control wheel 12 is mounted to the center of the platform 11, and the caster wheels 15 are mounted at four locations on a periphery of the drive section 13.

The carriage 10 can be moved forward or backward in the rightward direction by rotating only a drive wheel 12L on a left side of the drive section 13 forward and backward. The carriage 10 can be moved forward or backward in the leftward direction by rotating only a drive wheel 12R on a right side of the drive section 13. Alternatively, when the left drive wheel 12L is moved forward while the right drive wheel 12R is simultaneously moved backward at the same rotational rate, the carriage 10 can be turned rightward in place. The carriage 10 can also be turned leftward in place by moving the left drive wheel 12L backward and moving the right drive wheel 12R forward.

In the present example, the left and right drive wheels 12L, 12R were provided to the drive section 13. However, a configuration may also be adopted in which only one drive wheel 12 is provided and the orientation of the drive wheel 12 is turned left and right to steer the carriage 10.

The structure of the caster wheels 15 shall be described in further detail.

In the caster wheel 15, the base 31 is anchored to the platform 11; the holder member 32, which has the cross-sectional shape of a square opened on one side, is mounted about a center 45 of a turning shaft so as to be able to turn relative to the base 31, and the wheel 34 is rotatably mounted on the holder member 32 via the rotation shaft 33. Since the carriage 10 is reliably moved in a linear fashion, a distance T is maintained between the center 45 of the turning shaft and a center line of the rotation shaft 33.

A position detecting sensor 44F is mounted on a front end of the platform 11, and a position detecting sensor 44Re is mounted on a rear end of the platform 11.

FIG. 3 is a diagram that describes the control method for a self-propelled carriage during a switchback operation and the movement of the caster wheels in conjunction with the control method. A description shall be provided of a travel control method that is based on shuttling back and forth along a base line 51 and is performed by the travel-control section 18 (see FIG. 1) of the self-propelled carriage 10.

The base line 51 is composed of a magnetic tape attached to a path of the carriage. The magnetic force of the magnetic tape is detected by the position detection sensors 44F, 44Re provided to the self-propelled carriage 10, and functions as a trajectory for guiding the travel of the self-propelled carriage 10.

A configuration may also be adopted in which a wire is provided to the path surface on an installation or the path surface instead of the magnetic tape, an electric current is sent through the wire, and the induction current is detected by the position detecting sensors 44F, 44Re to guide the travel position of the self-propelled carriage 10.

In FIG. 3, reference symbol 53 indicates a trajectory traced by the center of the carriage 10 as a result of changes in the orientation of the caster wheel 15 after being switched back. The trajectory departs once from the base line, and thereafter returns to the base line 51.

An instance shall be described below in which the carriage 10 travels the trajectory 53, whereby the orientation of the caster wheel 15 is smoothly changed and lateral wobbling can be minimized.

A state is shown in (a) that is directly before the carriage 10 is stopped at a point 52 in the Re direction where switchback is to occur, receives a travel change command, and starts to be switched back in the F direction.

A first steering step 54 is shown in (b) in which the left steering/driving wheel 12L is moved backward in a direction 61 while the right drive wheel 12R is simultaneously moved forward in the direction 61 at the same rotational rate, the carriage 10 is rotated leftward in place, and the caster wheels 15 mounted on the four corners of the carriage 10 are turned in a rightward direction 62 about the center 45 (see FIG. 2) of the turning shaft. In other words, in the first steering step 54, when the carriage 10 receives a direction change command, the steering/driving wheel 12 is steered a predetermined angle θ during a stop, and the orientations of the caster wheels 15 are changed.

A state is shown in (c) in which the caster wheels 15 are turned further in the rightward direction 62 away from (b), and the carriage 10 is therefore made to travel a predetermined distance D while the steering angle of (b) is maintained. In other words, a step 55 is shown in which the carriage 10 is moved forward the predetermined distance D on the sub-line 53 from the state of (b), whereby the self-propelled carriage is made to depart from the base line 51, and the orientation of the caster wheels 15 is turned and changed in the rightward direction 62 to match the movement direction of the carriage.

A second steering step 56 is shown in (d) in which the steering of the carriage 10 is returned to a previous state and the carriage is then steered at an angle α in the rightward direction toward the bases line 51.

From (d) until (e), the carriage 10 is moved in the steering direction in the state shown in (d), and the orientation of the caster wheels 15 is further changed to match the moving direction.

In other words, a step 57 is shown in which the carriage 10 is moved forward a predetermined distance L in the state shown in (d), whereby the self-propelled carriage 10 is returned to the base line 51 while the orientations of the caster wheels 15 are smoothly changed in the movement direction of the carriage 10.

A third steering step 58 is shown in (e) in which the steering is returned to a previous state when the self-propelled carriage 10 reaches the base line 51, and the self-propelled carriage 10 is made to be capable of traveling along the base line 51.

In the first steering step 54, interference is avoided between a workpiece attaching/detaching station and the carriage. Therefore, once the carriage 10 has traveled the necessary distance in the forward movement direction, the first steering may be performed.

From (e) until (f), the carriage 10 returns to the base line 51 and travels for a certain amount of time. In (f), the position of the carriage 10 is reconfirmed by a provided position confirming sensor, and the control sequence is complete.

In the present example, a travel control method was described for an instance where the carriage 10 was switched from a backward direction back to a forward direction. However, as is also apparent, applications can also be envisioned in which a switch is made from a forward direction back to a forward direction.

The travel control section 18 is provided with the first steering step 54, in which the steering/driving wheels 12 are steered by the predetermined angle θ during a stop when the direction change command is received; and the step 55, in which the carriage is moved forward the predetermined distance D while in this state, whereby the self-propelled carriage is made to depart from the base line 51 and made to move to the sub-line 53, are provided. Therefore, the orientation of the caster wheels 15 can be changed from the orientation before the direction change command.

Further provided are the second steering step 56, in which the steering is returned to a previous state and the carriage is then steered in the direction opposite that of the first steering step 54 and toward the base line 51; and the step 57, in which the self-propelled carriage 10 is moved backward or forward the predetermined distance L while in this state, and thereby returned to the base line 51. Therefore, the caster wheels 15 whose orientations were changed can be smoothly changed to an orientation along the traveling direction.

Thus, when the self-propelled carriage 10 comprising the caster wheels 15 receives the direction change command and travels, the orientation of the caster wheels 15 can be smoothly changed to one along the traveling direction of the self-propelled carriage. Since the orientation of the caster wheels can be smoothly changed to one along the traveling direction of the self-propelled carriage, a change in direction will result in reduced lateral wobbling in the carriage 10 occurring in conjunction with the change in the orientation of the caster wheels 15, and a lower burden on the carriage 10.

In FIG. 2, according to the prior art, when a switchback operation is performed, problems arise in that the occurrence of lateral wobbling corresponding to the distance T between the center 45 of the rotation shaft and a center 33C of the rotation shaft 33 cannot be predicted, and the workpiece may fall off from the carriage due to the lateral wobbling, or the workpiece that is on the attachment may be dislodged.

A drive section and a steering section can both be provided in place of the caster wheels in response to the above-described lateral wobbling-related problems. Such a countermeasure can be accomplished using a so-called omnidirectional wheel. However, when the omnidirectional wheel is used, a problem remains in that the cost of the carriage increases.

According to the control method of the present invention, during a switchback operation, the orientation of the holder member 32 is smoothly and rapidly turned, whereby lateral wobbling in the carriage 10 can be reduced.

In addition, lateral wobbling in the carriage can be stopped promptly and at a fixed time.

As a result, the dramatic lateral wobbling and vibration conventionally encountered in self-propelled carriages can be dramatically reduced in the carriage 10. Therefore, precision parts and other parts adversely affected by vibration can be transported.

In addition, commercially available caster wheels are utilized. The cost of the carriage 10 does not therefore increase because lateral wobbling can be reduced by using a conventional structure.

The incidence of lateral wobbling can also be stopped promptly. Therefore, the speed of the carriage 10 can be quickly increased and the transport cycle time can be improved.

FIGS. 4A to 4D are operational diagrams showing when the travel control method for a self-propelled carriage according to the present invention is used in an automobile assembly line. A fuel tank 72 is transported to an assembly line for a four-wheel vehicle 71, the carriage 10 onto which the fuel tank 72 is mounted is switched from a backward direction back to a forward direction, and the fuel tank 72 is mounted on the four-wheel vehicle 71 in synchronization with the movement of the four-wheel vehicle 71 on the assembly line.

Figure 4A:
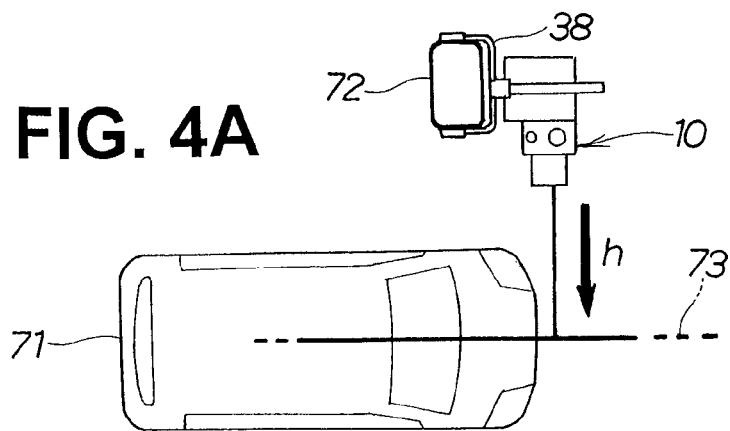
FIGS. 4A through 4D are views illustrating a travel control method for the self-propelled carriage, according to the present invention, as applied to an automobile assembly line.

In FIG. 4A, the carriage 10 onto which the fuel tank 72 has been placed proceeds in a direction h.

Figure 4B:
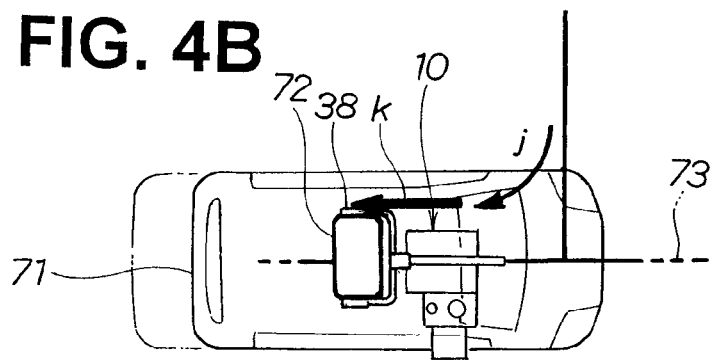

In FIG. 4B, the carriage 10 proceeds to a center line 73 of the assembly line, changes orientation to a j direction, proceeds in a k direction that is opposite the direction in which the assembly line proceeds, receives a direction change command from the control section 18 (see FIG. 1) at a switchback point, stops moving backward, and moves forward.

Lateral wobbling caused by the turning of the holder members 32 provided to the caster wheels 15 (see FIG. 1) of the free carriage 10 can be dramatically reduced by the travel control method for a self-propelled carriage according to the present invention. Vibration and impact forces acting on the fuel tank 72 in conjunction with the lateral wobbling are reduced, and the component parts are therefore not likely to fall out of place. Since the component parts are not likely to be dislodged, the attachment 38 and other work implements can be made simpler.

Figure 4C:
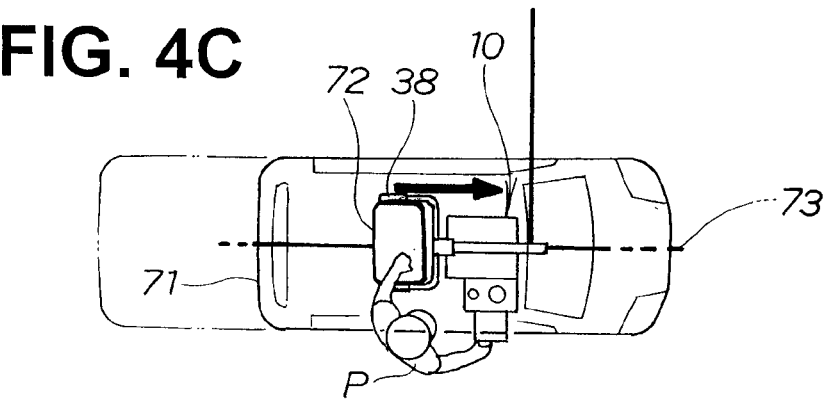

In FIG. 4C, an operator P mounts the fuel tank 72 on the four-wheel vehicle 71. The carriage 10 is switched back and synchronized to travel on the vehicle assembly line in the same direction and at the same rate as the assembly line.

The fuel tank 72 placed on the carriage 10 is not dislodged by the lateral wobbling that occurs during the operation for switching back the carriage 10. Therefore, the operation for positioning the four-wheel vehicle 71 on the moving assembly line can be improved. It is also possible to resolve problems wherein the quality of the fuel tank 72 (workpiece) is compromised by damage or other adverse effects caused by the lateral wobbling.

Figure 4D:
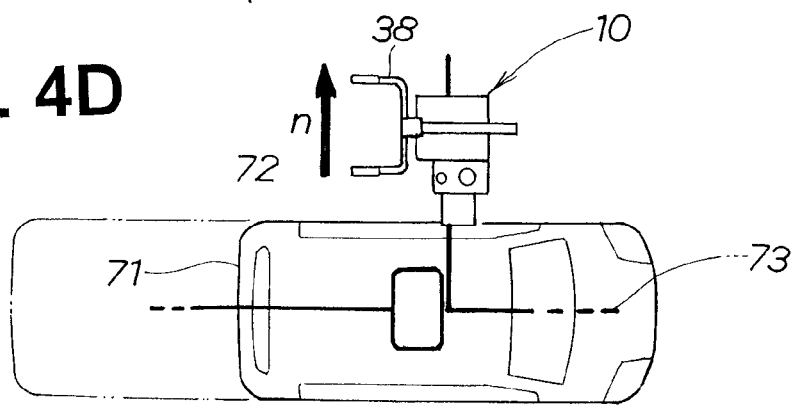

In FIG. 4D, an instance is shown in which the carriage 10 on which the fuel tank 72 has been mounted moves in a direction n away from a predetermined position of the center line 73 of the line, and preparation for the next operation is started.

Figure 5:
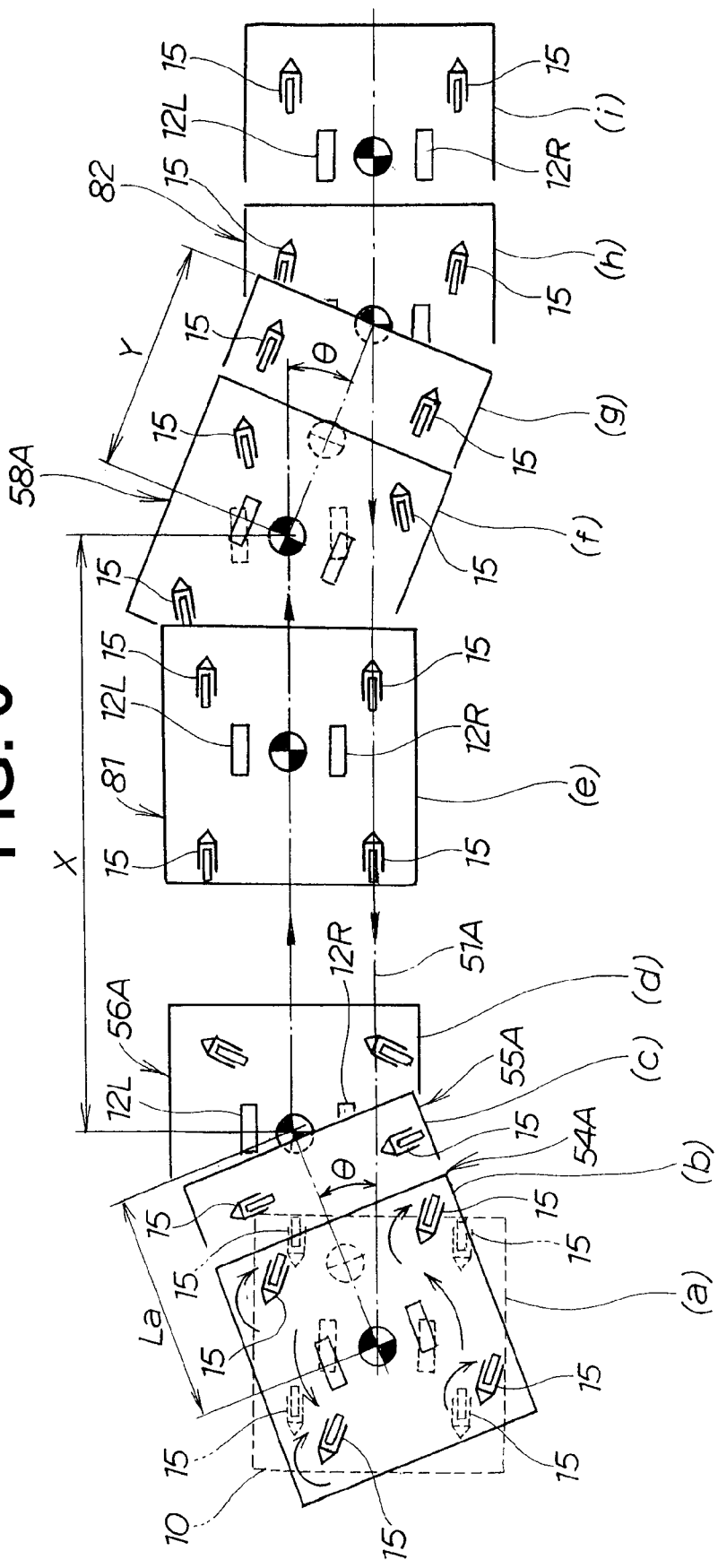
FIG. 5 is a diagram showing a separate embodiment of the self-propelled carriage shown in FIG. 3.
Figure 6:
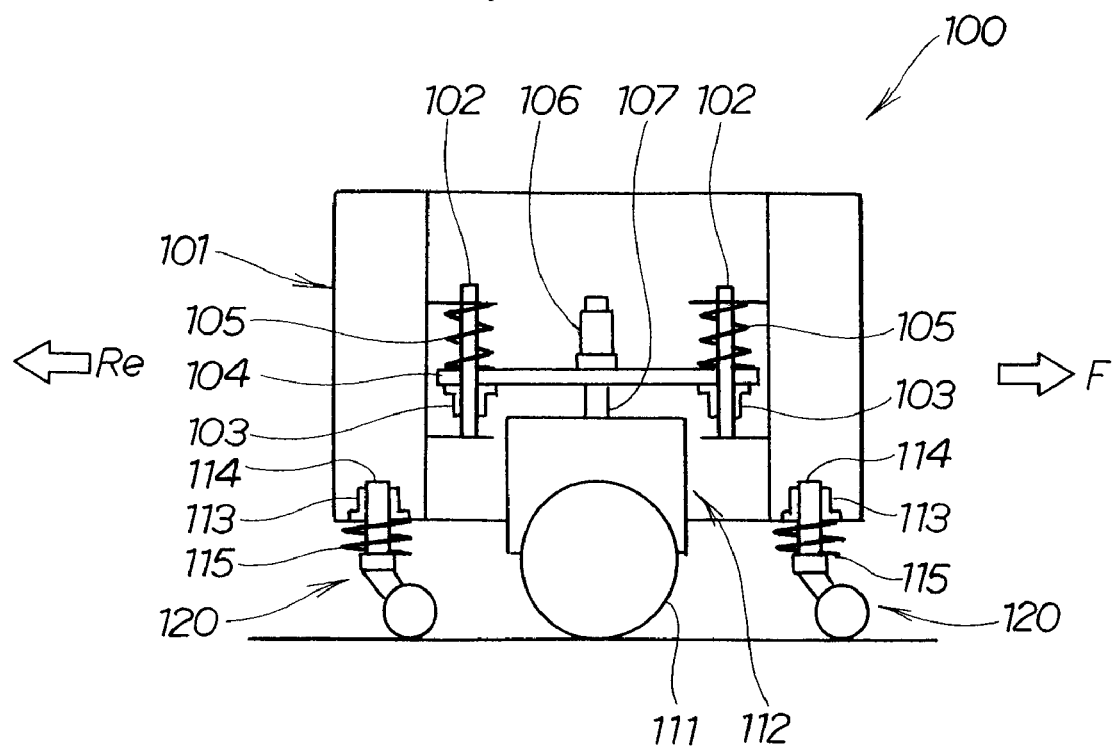
FIG. 6 is a schematic view illustrating a conventional self-propelled carriage.
Figure 7A:
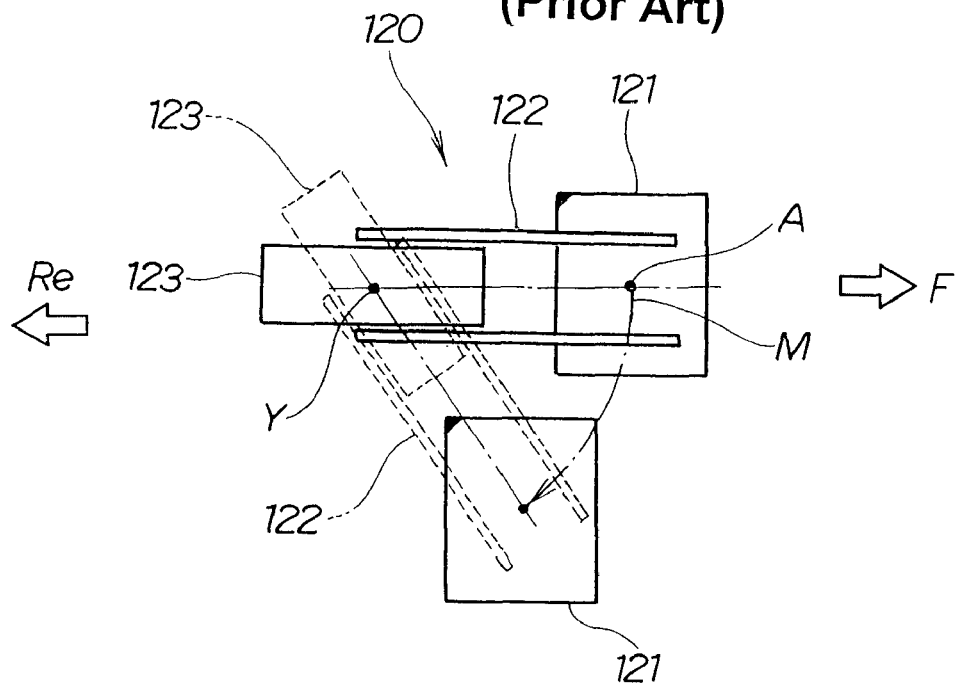
FIGS. 7A and 7B are respectively a top plan view and an operational diagram of a caster wheel shown in FIG. 6.
Figure 7B:
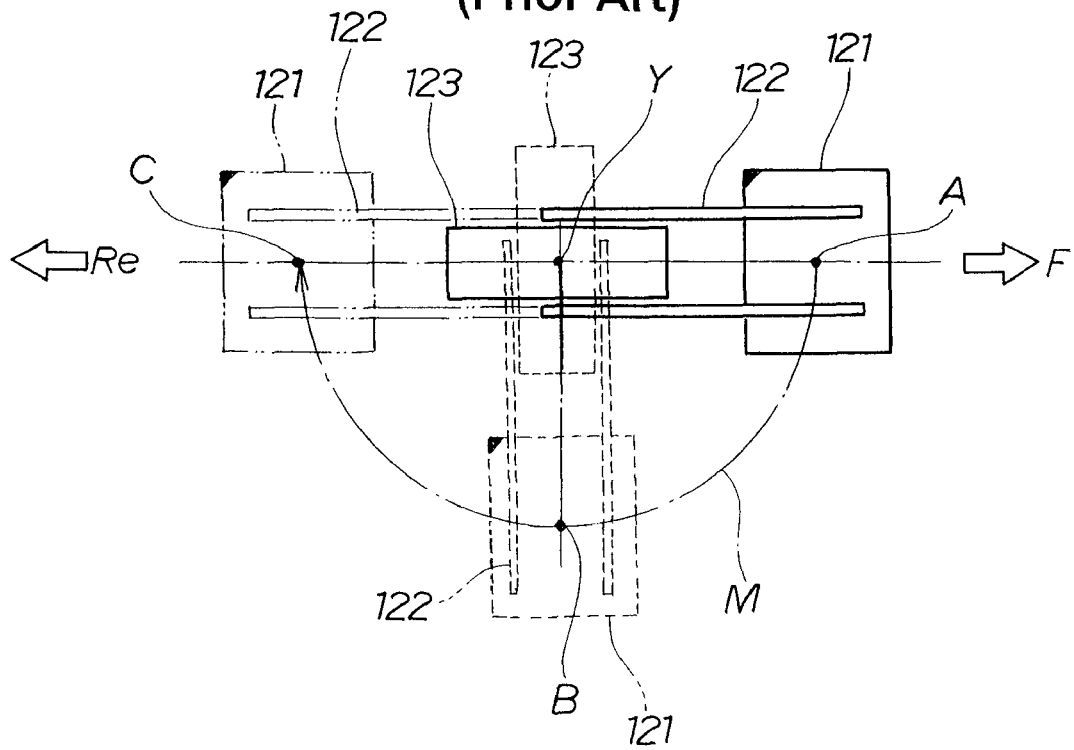

FIG. 5 is a diagram of another example of the example shown in FIG. 3. In the travel control method for the self-propelled carriage 10, a sequence of control operations is performed. The sequence comprises a first steering step 54A, in which, when the travel control section receives a direction change command to change the direction from backward to stop and then to forward, the steering/driving wheels 12 are steered by the predetermined angle θ during the stop; a step 55A in which the carriage is caused to move forward a predetermined distance La while in this state, whereby the self-propelled carriage 10 is caused to depart from a base line 51A; a second steering step 56A, in which the steering is returned to a previous state; a step 81 in which the self-propelled carriage 10 is caused to travel parallel to the base line 51A; a third steering step 58A in which the steering/driving wheels 12L, 12R are steered in a direction opposite the steering direction of the first steering step 54A; a step in which the carriage is caused to move forward a distance Y while in this state, whereby the self-propelled carriage 10 is returned to the base line 51A; and a fourth steering step 82 in which the steering is returned to a previous state when the self-propelled carriage 10 reaches the base line 51A, and the self-propelled carriage 10 is made to be able to travel along the base line 51A.

The present example differs from the example of FIG. 3 in the addition of the step 81 in which the self-propelled carriage 10 is caused to travel parallel to the base line 51A, and the third steering step 58A in which the steering/driving wheels 12L, 12R are steered in the direction opposite the steering direction of the first steering step 54A.<BR>
The predetermined distance X and the distance Y can be set as desired, and selected according to the structure of the caster wheels, the type of item mounted on the carriage, or other attributes.

INDUSTRIAL APPLICABILITY

As described above, the control method of this invention is particularly useful for a self-propelled carriage for conveying parts, workpieces, or the like in an industrial plant.

The invention claimed is:

1. A travel control method for a self-propelled carriage, which includes a base, steering/driving wheels steerably provided to the base, caster wheels provided to the base for stabilizing the carriage, and a travel control section for controlling the steering/driving wheels, and which is designed to shuttle back and forth along a base line in generally opposite directions, the travel control method comprising the steps of:
   causing the carriage to move in a first direction along the base line;
   stopping the carriage;
   steering the steering/driving wheels and carriage at a first predetermined angle while the carriage is stopped;
   causing the carriage to begin its return by moving a first predetermined distance in a second direction that is greater than 90 degrees but less than a full 180 degrees from the first direction while the steering/driving wheels and carriage remain at the first predetermined angle, thereby causing the self-propelled carriage to depart from the base line;
   steering the steering/driving wheels and carriage at a second predetermined angle so as to direct the carriage back toward the base line;
   causing the carriage to move a second predetermined distance while the steering/driving wheels and carriage remain at the second predetermined angle so that the carriage is steered toward the base line, thereby causing the self-propelled carriage to return to the base line; and
   steering the steering/driving wheels so a to direct the carriage in its return along the base line while moving in a direction generally opposite the first direction.

* * * * *